United States Patent [19]
Stratton

[11] Patent Number: 5,560,431
[45] Date of Patent: Oct. 1, 1996

[54] SITE PROFILE BASED CONTROL SYSTEM AND METHOD FOR AN EARTHMOVING IMPLEMENT

[75] Inventor: Kenneth L. Stratton, Dunlap, Ill.

[73] Assignee: Caterpillar Inc., Peoria, Ill.

[21] Appl. No.: 505,579

[22] Filed: Jul. 21, 1995

[51] Int. Cl.⁶ .......................... A01B 63/112; E02F 3/76
[52] U.S. Cl. ...................... 172/2; 172/826; 364/424.07
[58] Field of Search .................. 172/2, 3, 4, 4.5, 172/7, 12, 826; 364/424.07

[56] References Cited

U.S. PATENT DOCUMENTS

| | | |
|---|---|---|
| 3,576,268 | 4/1971 | Suverkrop . |
| 3,974,699 | 8/1976 | Morris et al. . |
| 4,157,118 | 6/1979 | Suganami et al. ............... 172/4.5 |
| 4,166,506 | 9/1979 | Tezuka et al. ................... 172/4.5 |
| 4,194,574 | 3/1980 | Benson et al. ................... 172/7 X |
| 4,263,973 | 4/1981 | Boulais et al. ................... 172/4.5 |
| 4,282,933 | 8/1981 | Suganami et al. ............... 172/4.5 |
| 4,423,785 | 1/1984 | Kurihara et al. ................. 172/3 |
| 4,630,685 | 12/1986 | Huck, Jr. et al. ................ 172/7 |
| 4,846,283 | 7/1989 | Batcheller ....................... 172/7 X |
| 4,893,287 | 1/1990 | Stratton et al. ................. 367/91 |
| 4,967,362 | 10/1990 | Schutten et al. ............... 364/424.07 |
| 5,174,385 | 12/1992 | Shinbo et al. ................. 172/4.5 |
| 5,462,122 | 10/1995 | Yamamoto et al. ........... 364/424.07 X |
| 5,467,829 | 11/1995 | Barton et al. ................. 172/826 X |

Primary Examiner—Terry Lee Melius
Assistant Examiner—Christopher J. Novosad
Attorney, Agent, or Firm—Thomas J. Bluth; David M. Masterson

[57] ABSTRACT

Apparatus and method for automatically controlling the position of an earthmoving implement of an earthmoving machine in response to varying ground profiles.

15 Claims, 4 Drawing Sheets

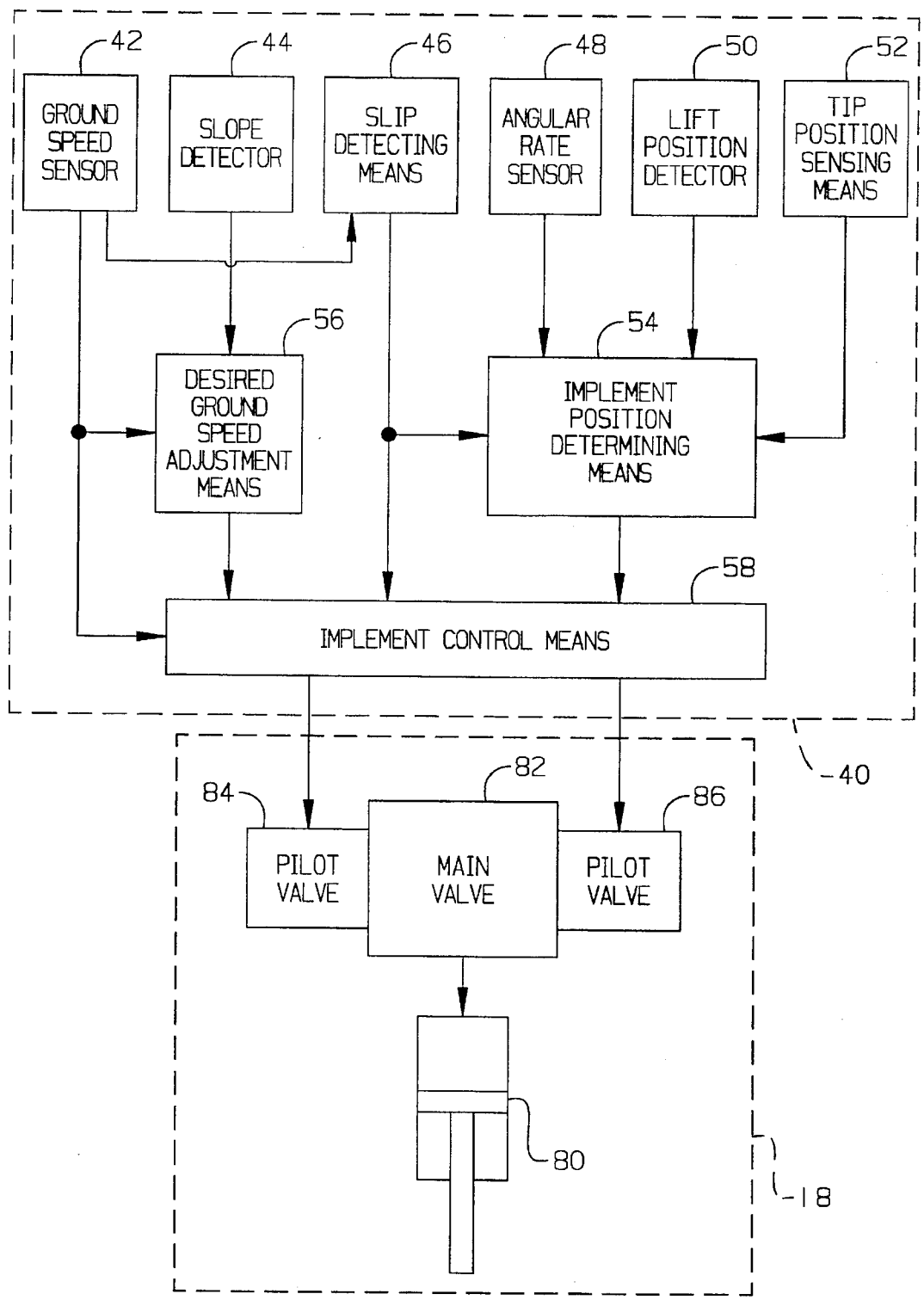

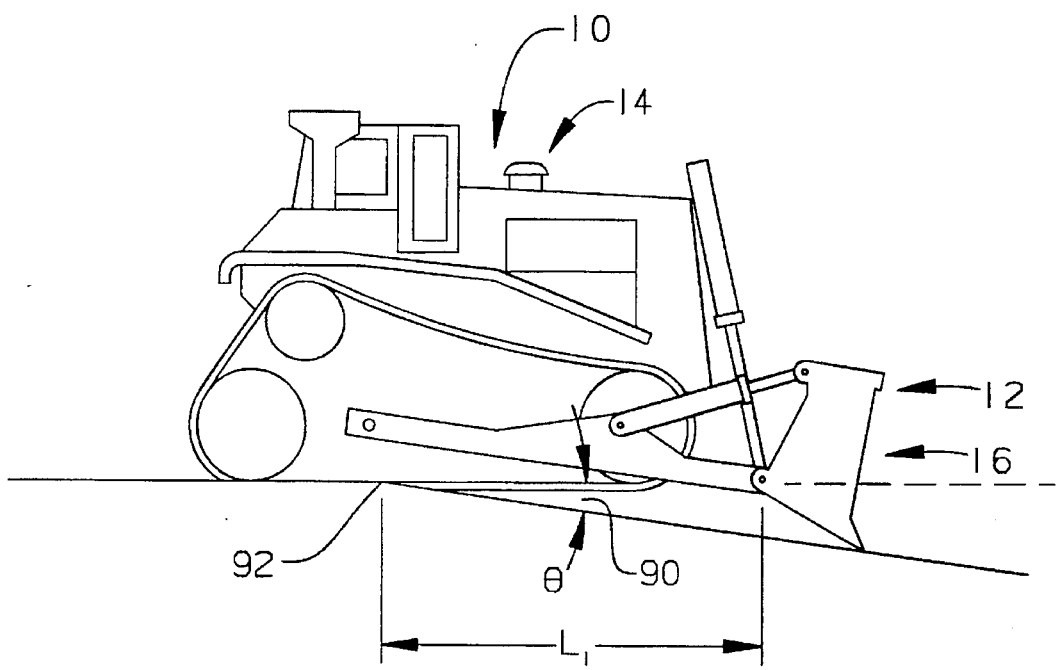
Fig_4a_
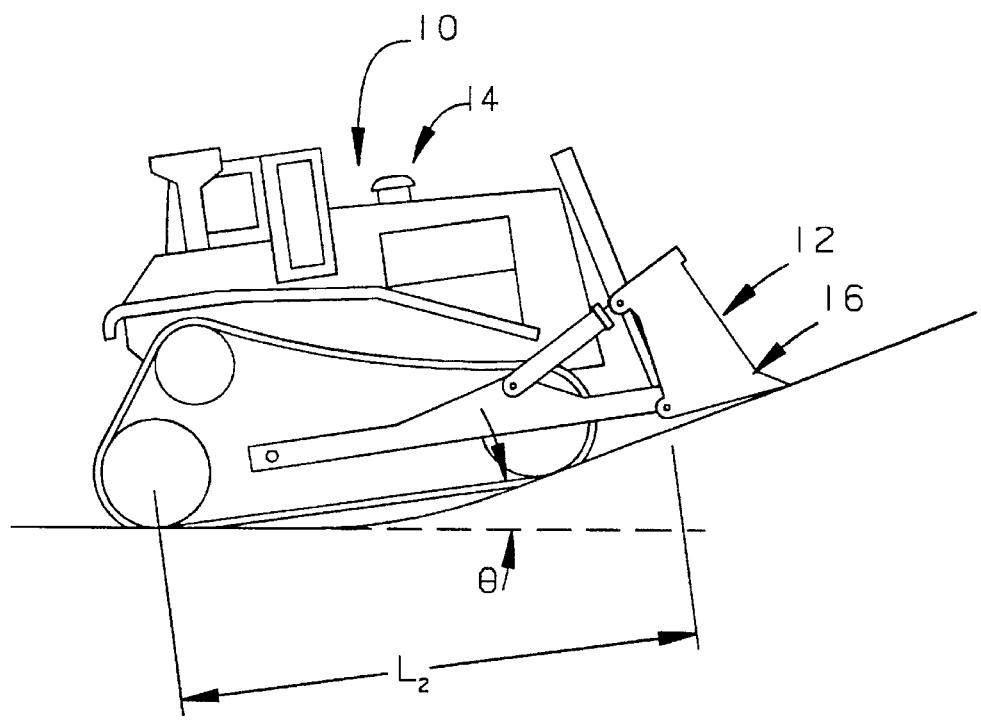
Fig_4b_

SITE PROFILE BASED CONTROL SYSTEM AND METHOD FOR AN EARTHMOVING IMPLEMENT

TECHNICAL FIELD

This invention relates to a control for an earthmoving implement of an earthmoving machine, and more particularly, to an apparatus and method which permits automatic control of the earthmoving implement in response to varying ground profiles.

BACKGROUND ART

It is advantageous for an earthmoving implement of an earthmoving machine such as a track/wheel bulldozer to be operated in a manner that results in the greatest productivity. Often manual control of an earthmoving implement, such as a bulldozer blade, is inefficient, particularly over a period of time as the operator tires.

Maximum productivity can be achieved by maximizing the "draft power" of the earthmoving machine. Draft power is the rate of actual useful work being done in moving the soil and is defined as the product of the draft force of the earthmoving implement and the ground speed of the earthmoving machine.

In the example of a bulldozer, draft force is the force on the blade. Maximum draft power is reached when the bulldozer is moving at optimum ground speed commensurate with draft force. For typical bulldozer operation, a ground speed of 1.6 mph allows for optimum power and efficiency. Operators do not have direct ground, speed feedback and they cannot see the load on the blade. Accordingly, operators often control the bulldozer on their sense of slip and engine speed. The use of slip as a feedback mechanism is inefficient because slippage does not occur until productivity hats already been lost. Operators that rely on their sense of slip feedback tend to run the bulldozer at a rate slower than that needed to achieve maximum power and efficiency. On the other hand, operators that rely on engine speed tend to run the bulldozer at a rate faster than that needed to achieve maximum power and efficiency.

Difficulties are often encountered in the control of the earthmoving implement when different ground profiles are encountered by the earthmoving machine. The earthmoving implement's position must be changed so that it won't dump its accumulated load nor cut to deeply, and still create a smooth cut. In addition, to maintain maximum efficiency, it is essential that the operator or the control system be able to differentiate between different ground profiles such as humps, rocks, and grade change.

Control systems have been developed that provide information for controlling the blade during various working conditions. However, the prior automatic control systems do not adequately control the blade position to achieve maximum efficiency in the variety of ground profiles encountered in operation. For example U.S. Pat. No. 4,630,685 by Huck et al. (the '685 Patent), discloses an apparatus for controlling an earthmoving implement using angular velocity. The '685 Patent is a relatively basic system in which ground speed and angular velocity directly control the actuator without an intervening loop on implement position. The lack an implement position control loop and the reliance on angular velocity results in lower operating efficiency when the earthmoving machine encounters varying ground profiles.

The present invention is directed to overcoming one or more of the problems as set forth above.

DISCLOSURE OF THE INVENTION

In one aspect of the invention, an automatic control system for an earthmoving implement of an earthmoving machine is provided. The automatic control system includes a lift actuator, a ground speed sensor, an angular rate sensor, a lift position sensing means, a slip detecting means, a slope detecting means, means for determining the position of the earthmoving implement and producing an implement position signal, desired ground speed adjustment means, and implement control means for calculating a change in the position of said earthmoving implement and issuing a lift actuator command signal.

In a second aspect of the invention, a method for automatically controlling an earthmoving implement of an earthmoving machine is provided. The method includes the steps of detecting a true ground speed of the earthmoving machine, determining the slope upon which the earthmoving moving machine is operating, sensing the angular rate, sensing the position of said lift actuator, determining a slip rate value, determining the position of said earthmoving implement and producing an implement position signal, adjusting a predetermined desired ground speed setting, and calculating a change in the position of the earthmoving implement and issuing a lift actuator command signal.

BRIEF DESCRIPTION OF THE DRAWINGS

FIG. 3 is a block diagram of the automatic control system for the earthmoving implement of the earthmoving machine.

FIG. 4A is a side view of the earthmoving machine pitching forward during a cut.

FIG. 4B is a side view of the earthmoving machine pitching aft during a cut.

DETAILED DESCRIPTION OF A PREFERRED EMBODIMENT OF THE INVENTION

Figure 1:
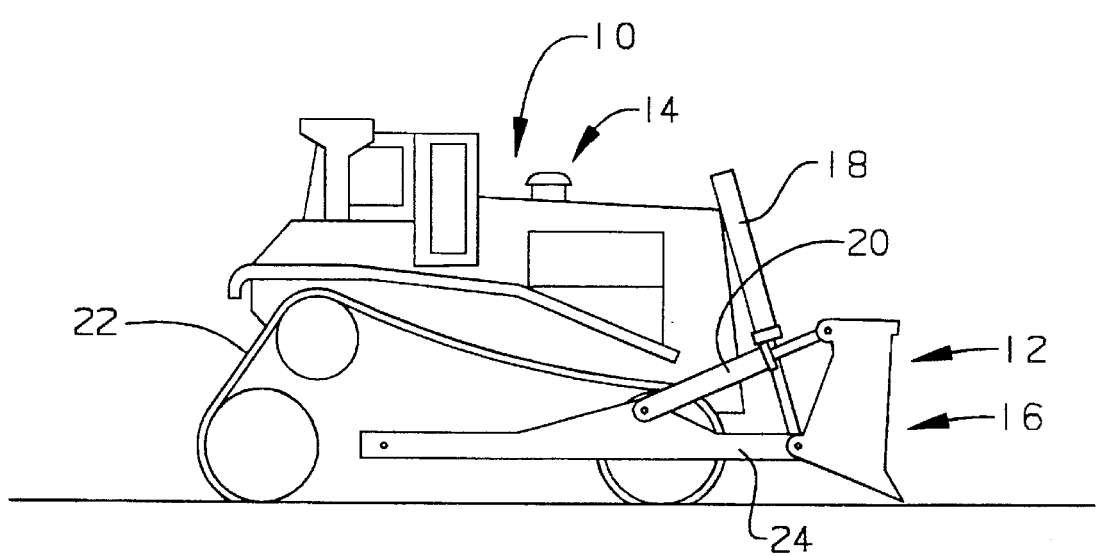
FIG. 1 is a diagram of the earthmoving machine.

With reference to the drawings, FIG. 1 shows a planar view of an earthmoving machine 10 having an earthmoving implement 12. The earthmoving implement 12 is utilized to move earth or soil.

For illustrative purposes the earthmoving machine 10 shown is a track-type bulldozer 14 and the earthmoving implement 12 shown is a bulldozer blade 16. While the invention is described using the bulldozer 14 and the bulldozer blade 16, it is intended that the invention also be used on other types of earthmoving machines 10 and earthmoving implements 12 such as a wheel loader or a track loader. The bulldozer 14 includes hydraulic lift actuators 18 for raising and lowering the blade 16 and hydraulic tilt actuators 20. Although not shown in FIG. 1, the bulldozer 14 preferably includes two lift actuators 18 and two tilt actuators 20, one on each side of the bulldozer blade 16. As shown in FIG. 1, the bulldozer 14 includes a set of tracks 22 and a draft arm 24 to push the blade 16.

Power applied to the blade 16 via the hydraulic lift cylinders 18 during earthmoving operations causes the blade 16 to push and carry the soil. Maximum productivity and efficiency is achieved by maintaining maximum power on the blade 16. Power in such a context is generally known as draft or blade power. Blade power is a measure of the rate of actual useful work being done in moving the soil and can be expressed as follows:

P=F×V

P=Blade Power

F=Blade Force

V=Ground Speed

Figure 2:
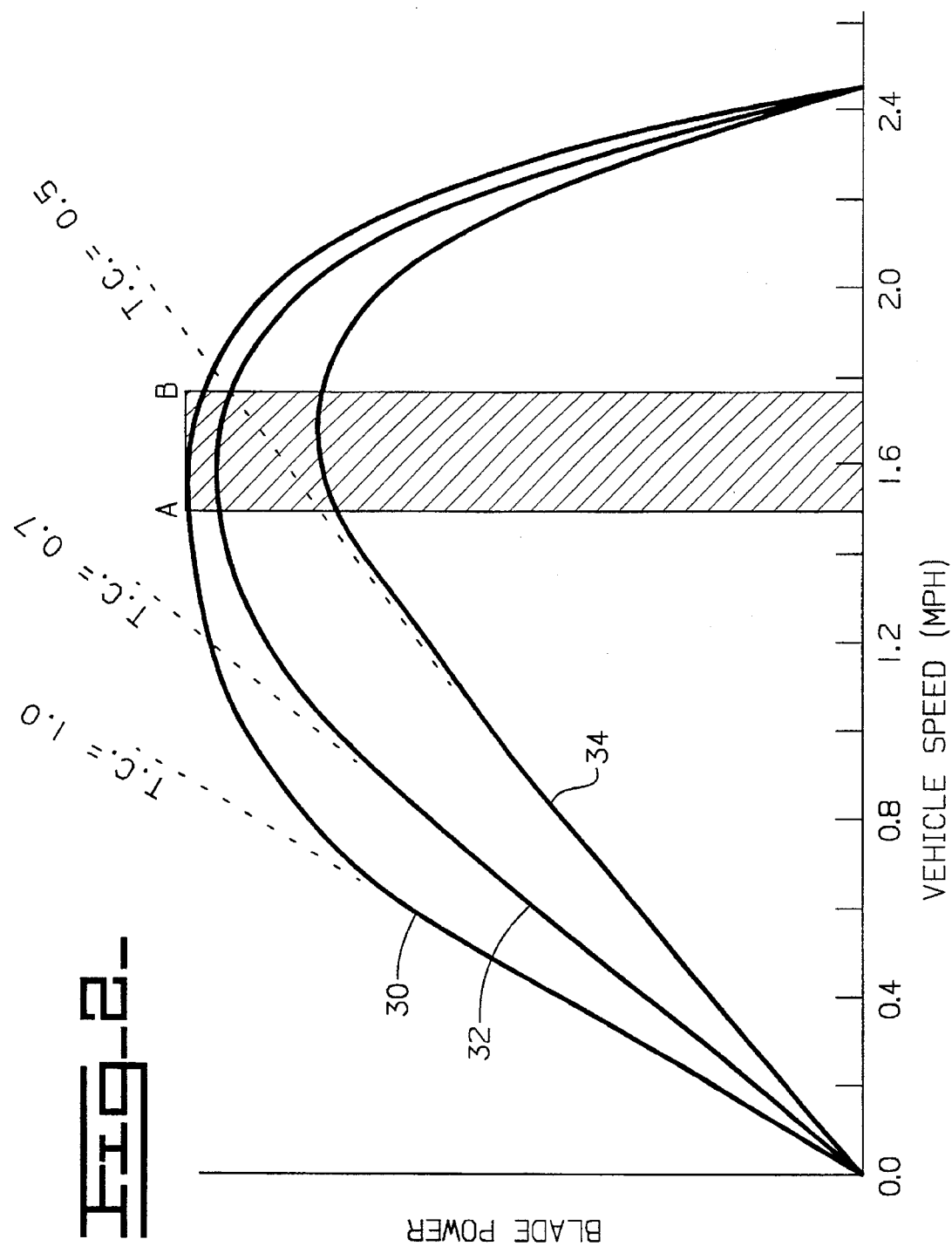
FIG. 2 is a graphic representation of ground speed versus implement power.

The relationship between ground speed of the bulldozer 14 relative to the ground and the blade power is shown in FIG. 2 for different traction coefficients. Traction coefficients vary according to ground materials and conditions.

A first power curve 30 is shown in FIG. 2 and corresponds to a traction coefficient of 1. However, a traction coefficient of 1 is almost never realized in actual operation. Second and third power curves 32,34 correspond to traction coefficients of 0.7 and 0.5 respectively. In most applications, including mining applications, the traction coefficient is typically in the range between 0.5 and 0.7. Maximum forward power productivity is achieved when the bulldozer 14 is operated at the peaks of the power curves 30, 32, 34. Blade power is maximum between states "A" and "B" for all of the depicted power curves 30, 32, 34. As shown in FIG. 2, a vehicle ground speed of approximately 1.6 MPH delivers the desired blade power between states "A" and "B".

FIG. 3 shows a block diagram of an automatic control system 40 for the earthmoving implement 12 of the earthmoving machine 10. The automatic control system 40 is adapted to control the lift actuator 18. For the purposes of illustration, the lift actuator 18 depicted in the block diagram of FIG. 3 is shown as a single hydraulic lift cylinder 80 with a single main valve 82 and two pilot valves 84,86.

The automatic control system 40 includes a ground speed sensor 42. The ground speed sensor 42 senses the true ground speed "V" of the earthmoving machine 10 and responsively produces a ground speed signal. The ground speed sensor 42 is suitably positioned on the bulldozer 14 and includes, for example, a non-contacting ultrasonic or Doppler radar type sensor.

The automatic control system 40 also includes a slope detector 44 for determining the slope or inclination upon which the bulldozer 14 is operating. The scope detector 44 produces a slope signal. In the preferred embodiment the slope detector 44 includes an angular rate sensor such as a gyroscope in conjunction with a Kalman filter which provides optimum performance in both steady state and dynamic applications. A slope detector sensor utilizing capacitive or resistive fluids may also be used. However, such a sensor does not perform well in dynamic situations and requires that the bulldozer 14 be stopped after every pass to allow the sensor to reset.

A slip detecting means 46 detects the amount of slip encountered by the tracks 22 of the bulldozer 14 and produces a slip signal. The slip detecting means 46 receives the ground speed signal from the ground speed sensor 42 and calculates the amount of slip by utilizing the ground speed with, for example, the output speed of a torque converter, sprocket speed, and gear selection. Algorithms for the determination of amount of slip are well known in the art and will not be discussed in greater detail.

The automatic control system 40 includes an angular rate sensor 48 which senses the angular rate of the bulldozer 14 and produces an angular rate signal. The angular rate sensor is suitably positioned on the bulldozer 14 and includes, for example, a gyroscope. A quartz-gyro chip manufactured by Systron is suitable for this application.

A lift position sensing means 50 senses the position of lift actuator 18 and produces a lift position signal. The lift position sensing means 50 is suitably positioned on the lift actuators 18. There are several known linear position sensing devices that measure absolute position and can be used in connection with the cylinders of the lift actuators 18. For example, RF (radio frequency) sensors or LVDT (linear variable differential transformer) are both well known and suitable. In addition, the lift position sensing means 50 could be replaced by a device that measures the position of the earthmoving implement 12 relative to the earthmoving machine 10 such as a radar system.

A tip position sensing means 52 senses the tilt of the blade 16 and produces a tip position signal. A relative position is calculated as a function of the amount of hydraulic fluid entering the cylinders of the hydraulic tilt actuators 20, which is a function of the flow rate of hydraulic fluid and the time over which fluid enters the cylinders of the hydraulic tilt actuators 20. The tip position sensing means 52 and associated method is described in greater detail in application Ser. No. 08/159,275 entitled "Automatic Lift And Tilt Coordination Control System And Method Of Using Same" by Stratton et al. which is herein incorporated by reference.

The automatic control system 40 further includes an implement position determining means 54 for determining the position of blade 16. The implement position determining means 54 receives the slip signal from the slip detecting means 46, the angular rate signal from the angular rate sensor 48, the lift position signal from the lift position sensing means 50, and the tip position signal from the tip position sensing means 52. In another embodiment, which will be described in greater detail hereafter, the implement position determining means 54 does not utilize the tip position signal from the tip position sensing means 52.

The implement position determining means 54 uses the above identified signals to calculate the height of the blade 16 as function of up to three terms. The first blade height term is primarily a function of the angular rate signal. The angular rate signal can be integrated to derive a change in the pitch angle and the pitch angle itself.

Referring now to FIG. 4A, the bulldozer 14 and the blade 16 are shown pitching forward into the cut from the top. As this forward pitch occurs, the blade 16 cuts deeper into the soil. The pitch angle 90 is shown in FIG. 4A. In addition, as illustrated in FIG. 4A, the forward pitch axis 92 is approximately the COG (center of gravity) of the bulldozer 14 and the distance from the forward pitch axis 92 to the blade 16 is identified as "L1".

Likewise, in FIG. 4B, the bulldozer 14 and the blade 16 are shown pitching backward or aft, the blade 16 tends to move out: of the soil. The pitch angle 90 is shown in FIG. 4B. In addition, as depicted in FIG. 4B, the aft pitch axis 94 is approximately the rear idler of the bulldozer 14 and the distance from the aft pitch axis 94 to the blade 16 is identified as "L".

The implement position determining means 54 calculates the first term of the blade height position (PIT_TM) according to the following equation:

$$\text{PIT\_TM} = K1 \int PA(t) \Theta \, dt$$

where:
  K1=Distance from either the rear idler (L1) or the COG (L2) to the blade (in mm) * 0.01745 rad/deg
  PA=Pitch Axis (L1 or L2)
  Θ=Pitch Angle If the pitch angle is greater than a distance filtered pitch angle, then K1 is a constant value associated with the rear idler distance (L1). Otherwise K1 is a constant value associated with the COG distance (L2). In addition, if K1 is a constant associated with the rear idler, the constant is altered as a function of slip in accordance with a look-up table. The purpose of altering the K1 value as a function of the slip signal when the aft pitch axis 94 is utilized is to account for sinkage caused by the track slip. The look-up table decreases the value of K1 as the slip increases.

The second blade height term (LFT_TM) is primarily a function of the lift position signal produced by the lift position sensing means 50. The implement position determining means 54 calculates the second term of the blade height position according to the following formula:

$$LFT\_TM = L2 * \text{Lift Position}$$

The term K2 is a constant based on the geometry of the cylinder to account for the angle at which the lift actuator 18 is positioned with respect to the bulldozer 14.

The third blade height term (TIP_TM) is primarily a function of the tip position signal produced by the tip position sensing means 52. The implement position determining means 54 calculates the pitch angle of the blade from the tip position signal. The implement position determining means 54 calculates the third term of the blade height position according to the following formula:

$$TIP\_TM = K3 * \text{Pitch Angle of Blade}$$

The term K3 is a constant based upon the geometry of the blade 16 and the tilt actuator 16 arrangement. The implement position determining means 54 sums the three blade height terms (PIT_TM+LFT_TM+TIP_TM) to derive the implement position signal (IP_REF). The implement position determining means 54 may also sum only the first two 'terms (PIT_TM+LFT_TM) to derive the implement position signal (IP_REF).

The automatic control system 40 further includes a desired ground speed adjustment means 56 which adjusts a predetermined desired ground speed setting. The operator may adjust the desired ground speed setting. Under normal conditions, the desired ground speed setting is 1.6 MPH as depicted in FIG. 2. The desired ground speed adjustment means 56 adjusts the desired ground speed as a function of the slope signal produced by the slope detector 44 and produces an adjusted ground speed reference signal. The adjustment is accomplished by use of look-up tables that correlate various slope values with ground speed values. For example, for a 20% grade, your desired speed may be down to 1.4 MPH. This feature maintains the blade load as the slope of the ground changes. Such a change in adjustment is essential to optimize productivity on varying grades.

The automatic control system 40 includes an implement control means 58 which calculates a change in the position of the blade 16 and issues a lift actuator command signal to control the hydraulic lift actuators 18. The implement control means 58 receives the ground speed signal from the ground speed sensor 42, the adjusted ground speed reference signal from the desired ground speed adjustment means 56, the slip signal from the slip detecting means 46, and the implement position signal from the implement position determining means 54.

The implement control means 58 calculates and determines the proper lift actuator command signal in two stages. In the first stage, a desired implement position term is calculated as a function of four basic values. The first value (IP_REF) is the implement position as delivered by the implement position signal.

The second value used in the first stage of the calculation process followed by the implement control means 58 is a slip error value (SLP_ERR). The slip error value is derived from the slip signal. The implement control means 58 calculates the slip error value according to the following formula:

$$SLP\_ERR = K4 \int SV - (0.0165) SV \, \Delta X$$

where:
K4=Stability Constant
SV=Slip Value
$\Delta x$=Change in Distance
If SLP_ERR<0, then SLP_ERR=previous SLP_ERR K4 is a predetermined constant that is based on stability criteria. The use of such a constant is known by those skilled in the art.

The third value used in the first stage of the calculation process followed by the implement control means 58 is a speed error value (SPD_ERR). The speed error value is derived from the ground speed signal and adjusted ground speed reference signal. The implement control means 58 calculates the speed error value according to the following formula:

$$SPD\_ERR = K5 \int (SPEED - SPEEDREF) \, \Delta x$$

where:
K5=Stability Constant
SPEED=Ground Speed
SPEEDREF=Adjusted Speed Reference Signal
$\Delta x$=Change in Distance K5 is a predetermined constant that is based on stability criteria. The use of such a constant is known by those skilled in the art.

The slip error value (SLP_ERR) and the speed error value (SPD_ERR) are limited to certain percentage changes to avoid stability problems. For example, when the blade is lowering into the ground, the percent change allowed is 6%. When raising the blade, the percent change allowed is 20%.

The fourth value used in the first stage of the calculation process followed by the implement control means 58 is a proportional speed value (PRO_SPD). The proportional speed value is derived from the ground speed signal and adjusted ground speed reference signal. The implement control means 58 calculates the proportional speed value according to the following formula:

$$PRO\_SPD = K6 \, (SPEED - SPEEDREF)$$

where:
K6=A Constant
SPEED=Ground Speed
SPEEDREF=Adjusted Speed Reference Signal K6 is a predetermined constant. The proportional speed value allows the blade to adjust to rocks encountered in the soil compared to slope changes because it is based solely on ground speed change.

The first stage results in the computation of a desired implement position value (IP_DES) by summing the four terms: initial implement position, slip error value,, speed error value, and proportional speed proportional value:

$$IP\_DES = IP\_REF + SLP\_ERR + SPD\_ERR + PRO\_SPD$$

In the second stage, a lift actuator command signal (LFT_CMD) is produced as a function of the desired implement position term (IP_DES) computed in the first stage and the implement position signal (IP_REF) produced by the implement position determining means 54. The lift actuator command signal is derived from the difference between the desired implement position term and the implement position signal (IP_ERR) in the following manner:

$$IP\_ERR = IP\_DES - IP\_REF$$

$$LFT\_CMD = K7(TQ,PR)*IP\_ERR + K8(TW,PR)*d(IP\_ERR)/dx$$

The terms K7(TQ, PR) and KS(TQ, PR) are derived from lookup tables that vary in accordance with torque and pitch rate so that when there is a small blade load, the gain value of the terms is reduced to increase stability. The use of such constants are known in the art. The lift actuator command signal (LFT_CMD) controls the earthmoving implement 12.

As adjustments are made to the earthmoving implement 12, a ground profile can be stored in the automatic control system 40. The ground profile is a map of the contours of the ground covered by the earthmoving machine 10. When the earthmoving machine 10 transverses the same route, the stored ground profile (GND_HT) would be delivered to the implement control means 58 anti used in the calculation of the desired implement position term (IP_DES) in the following manner:

$$IP\_DES = IP\_REF + SLP\_ERR + SPD\_ERR + PRO\_SPD + K\Delta GND\_HT$$

The ground profile term, K∆GND_HT, includes a predetermined constant multiplied by the change in ground height from the ground profile. The term provides a feed-forward element to allow the earthmoving implement 12 to adjust in accordance with upcoming changes in the ground profile.

Industrial Applicability

The automatic control system 40 is advantageously used in construction equipment such as wheel and track/type bulldozers. It can be appreciated that by using the present invention, a bulldozer can operate in the most productive mode. Stable implement control is maintained over all ground profiles encountered by the earthmoving machine 10. Productivity is substantially enhanced by automatically controlling the earthmoving implement 12 in response to sensed variables directly related to blade power.

Other aspects, objects, and advantages of this invention can be obtained from a study of the drawings, the disclosure, and the appended claims.

We claim:

1. An automatic control system for an earthmoving implement of an earthmoving machine, comprising:

a lift actuator associated with said earthmoving implement;

a ground speed sensor having a ground speed signal;

an angular rate sensor having an angular rate signal;

a lift position sensing means associated with said lift actuator for sensing the position of said lift actuator and producing a lift position signal;

a slip detecting means for determining a slip rate value of said earthmoving machine and producing a slip signal;

means for determining the position of said earthmoving implement as a function of said slip signal, said angular rate signal and said lift position signal and producing an implement position signal; and implement control means for receiving said implement position signal, said slip signal, and said ground speed signal and responsively calculating a change in the position of said earthmoving implement and issuing a lift actuator command signal.

2. Art automatic control system for an earthmoving implement of an earthmoving machine, as set forth in claim 1, including a manual control member.

3. An automatic control system for an earthmoving implement of an earthmoving machine, as set forth in claim 1, including means for determining and storing a ground profile, said ground profile being indicative of the contours of the ground previously transversed by said earthmoving machine.

4. An automatic control system for an earthmoving implement of an earthmoving machine, as set forth in claim 3, wherein said implement control means includes means for receiving said ground profile and responsively calculating a change in the position of said earthmoving implement.

5. An automatic control system for an earthmoving implement of an earthmoving machine, as set forth in claim 1, wherein said angular rate sensor comprises a gyroscope.

6. An automatic control system for an earthmoving implement of an earthmoving machine, as set forth in claim 1, wherein said lift position sensing means comprises an LVDT sensor.

7. An automatic control system for an earthmoving implement of an earthmoving machine, as set forth in claim 1, wherein said lift position sensing means comprises an RF sensor.

8. An automatic control system for an earthmoving implement of an earthmoving machine, as set forth in claim 1, wherein said means for determining the position of said earthmoving implement includes means for determining the pitch axis of said earthmoving machine as a function of said slip signal and said angular rate signal.

9. An automatic control system for an earthmoving implement of an earthmoving machine, as set forth in claim 1, including:

slope detecting means for detecting the slope upon which said earthmoving machine is operating and producing a slope signal; and ground speed adjustment means for adjusting a predetermined desired ground speed setting as a function of said slope signal and producing an adjusted ground speed reference signal.

10. An automatic control system for an earthmoving implement of an earthmoving machine, as set forth in claim 9, wherein said implement control means comprises:

means for determining a slip error value as a function of said slip signal;

means for determining a speed error value as a function of said ground speed signal and said adjusted ground speed reference signal;

means for determining a speed proportional value as a function of said ground speed signal and said adjusted ground speed reference signal;

first control loop means for calculating a desired implement position value as a function of said slip error value, said speed error value, said speed proportional value and said implement position signal; and second control loop means for calculating a change in the position of said earthmoving implement as a function of said desired implement position and said implement position signal and issuing a lift actuator command signal.

11. An automatic control system for an earthmoving implement of an earthmoving machine, comprising:

a lift actuator associated with said earthmoving implement;

a tip position sensing means associated with said earthmoving implement for sensing the tilt of said earthmoving implement and producing a tip position signal;

a ground speed sensor having a ground speed signal;

an angular rate sensor having an angular rate signal;

a lift position sensing means associated with said lift actuator for sensing the position of said lift actuator and producing a lift position signal;

a slip detecting means for determining a slip rate value of said earthmoving machine and producing a slip signal;

a slope detecting means for detecting the slope upon which said earthmoving machine is operating and producing a slope signal;

means for determining the position of said earthmoving implement as a function of said slip signal, said angular rate signal, said tip position signal and said lift position signal and producing an implement position signal;

ground speed adjustment means for adjusting a predetermined desired ground speed setting as a function of said slope signal and producing an adjusted ground speed reference signal; and implement control means for receiving said implement position signal, said slip signal, said adjusted ground speed reference signal and said ground speed signal and responsively calculating a change in the position of said earthmoving implement and issuing a lift actuator command signal.

12. An automatic control system for an earthmoving implement of an earthmoving machine, comprising:

a lift actuator associated with said earthmoving implement;

a ground speed sensor having a ground speed signal;

an angular rate sensor having an angular rate signal;

an implement position sensing means for sensing the position of said earthmoving implement relative to said earthmoving machine and producing a lift position signal;

a slip detecting means for determining a slip rate value of said earthmoving machine and producing a slip signal;

a slope detecting means for detecting the slope upon which said earthmoving machine is operating and producing a slope signal;

means for determining the position of said earthmoving implement as a function of said slip signal, said angular rate signal and said lift position signal and producing an implement position signal;

ground speed adjustment means for adjusting a predetermined desired ground speed setting as a function of said slope signal and producing an adjusted ground speed reference signal; and implement control means for receiving said implement position signal, said slip signal, said adjusted ground speed reference signal and said ground speed signal and responsively calculating a change in the position of said earthmoving implement and issuing a lift actuator command signal.

13. A method for automatically controlling an earthmoving implement of an earthmoving machine, said earthmoving implement including a lift actuator, the method comprising the steps of:

detecting a true ground speed of said earthmoving machine and producing a ground speed signal;

sensing the angular rate of said earthmoving machine and producing an angular rate signal;

sensing the position of said lift actuator and producing a lift position signal;

determining a slip rate value of said earthmoving machine and producing a slip signal;

determining the position of said earthmoving implement as a function of said slip signal, said angular rate signal and said lift position signal and producing an implement position signal; and receiving said implement position signal, said slip signal, and said ground speed signal and responsively calculating a change in the position of said earthmoving implement and issuing a lift actuator command signal.

14. A method, as set forth in claim 13, including the step of determining and storing a ground profile, said ground profile being indicative of the contours of the ground previously transversed by said earthmoving machine.

15. A method, as set forth in claim 14, including the step of adjusting said lift actuator command signal as a function of said ground profile.

* * * * *